Feb. 10, 1942.   I. H. WITT   2,272,734
MEANS FOR STOPPING FLOW OF FLUID IN CONDUITS
Filed June 21, 1940   2 Sheets-Sheet 1
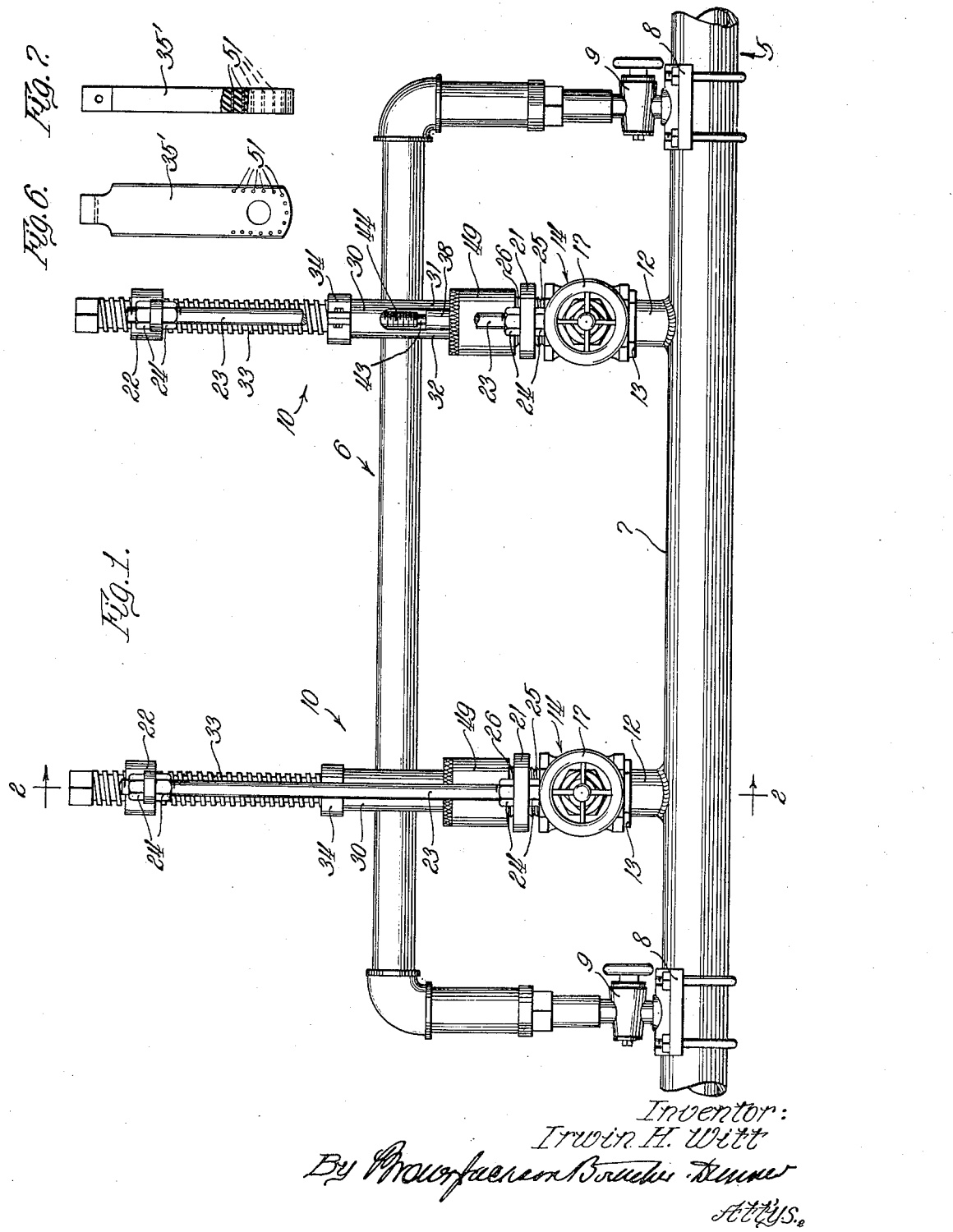
Inventor:
Irwin H. Witt
By [signature]
Attys.

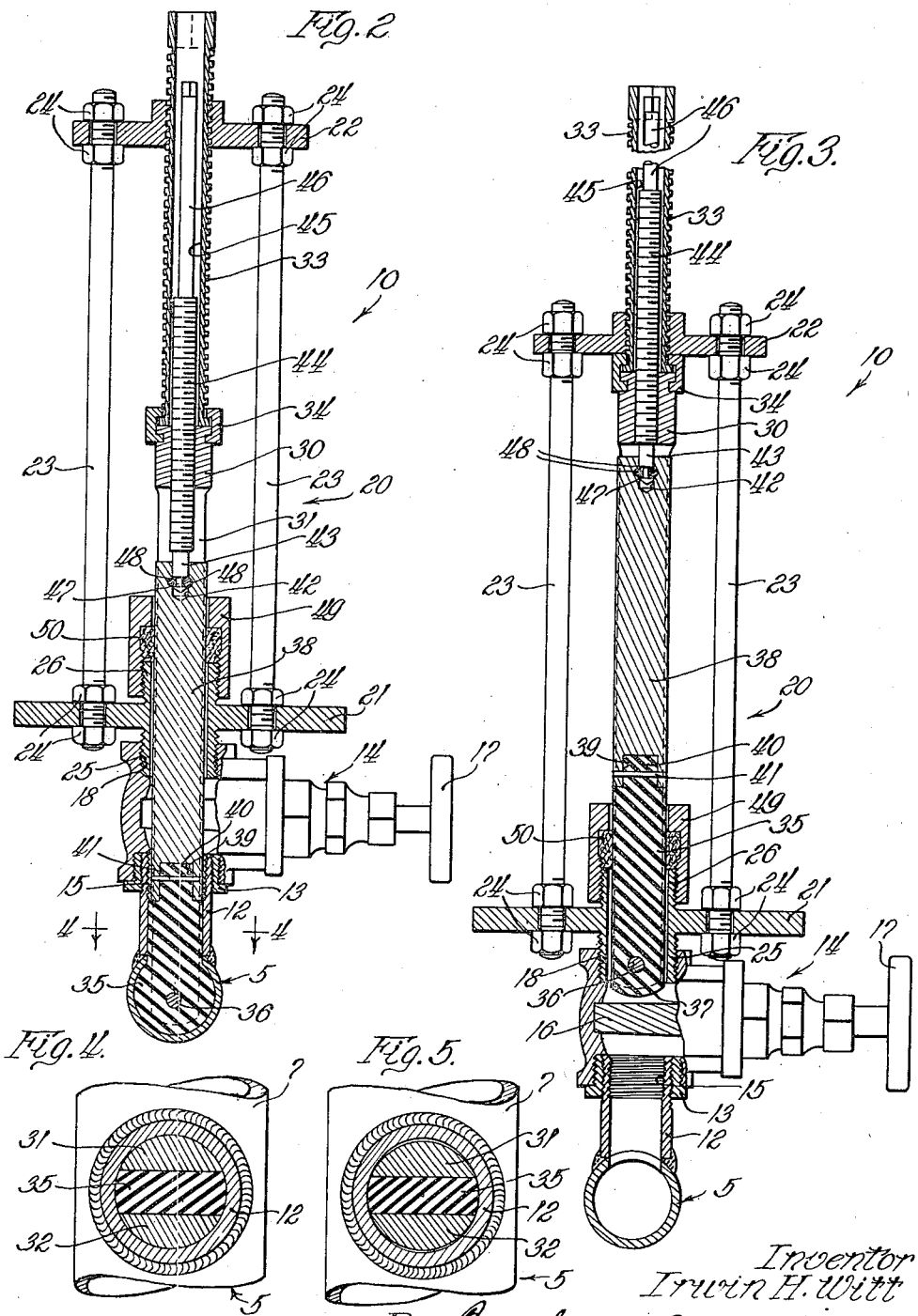

Patented Feb. 10, 1942

2,272,734

UNITED STATES PATENT OFFICE 2,272,734

MEANS FOR STOPPING FLOW OF FLUID IN CONDUITS

Irwin H. Witt, Evanston, Ill.

Application June 21, 1940, Serial No. 341,661

3 Claims. (Cl. 138—94)

The present invention relates to means for stopping flow of fluid in a conduit. The device of my invention has particular utility in a gas distributing system in which it frequently becomes necessary to extend a main or branch, repair a section thereof, or insert T's or other fittings. The invention may be applied to conduits for other fluids.

Stopping flow of gas through the section of a gas pipe to be worked upon or through an end thereof to be extended has heretofore been quite difficult, especially in high pressure systems. In such systems, the diameter of the main is quite small and the pressure maintained within the main may exceed 100 pounds per square inch. It is essential when repairing or extending such a system, that means be provided which will completely seal the conduit and openings therein to prevent the escape of gas.

It is known in the art, according to my prior Patent No. 2,002,383, to form an ice plug in a conduit by introducing slush ice through an opening made therein and by solidifying the slush ice by means of a pack of dry ice (frozen $CO_2$) enclosed within a canvas container, which is disposed outside the conduit. This type of plug has several disadvantages. For example, a quantity of slush ice and dry ice must always be available which adds to the cost, the slush ice must be introduced gradually requiring the expenditure of considerable time in making the plug, and the necessity of handling ice renders the apparatus inconvenient in use.

The present invention broadly contemplates the provision of resilient means which is adapted to be inserted through an opening in a conduit and subsequently expanded to stop the flow of fluid through the conduit. It is a feature of the invention to provide a resilient plug, preferably made of rubber or its equivalent, which is adapted to be expanded by deformation within the conduit into fluid tight engagement with the inside wall thereof. A further feature is the provision of a carrier member having fork arms between which the resilient plug is disposed so that upon deformation of the plug to expand it, the fork arms are forced outwardly away from each other into engagement with the wall of the conduit defining the opening through which the carrier member is adapted to be inserted. A further object is the provision of suitable apparatus for accomplishing the objectives noted, which does not require any special technique in its handling and by the use of which escape of fluid from the conduit is prevented.

Other and incidental objects and advantages will be apparent from the detail description.

Now in order to acquaint those skilled in the art with the manner of constructing and operating my invention, I shall describe in connection with the accompanying drawings, a specific embodiment of the same which for purposes of illustration is disclosed in connection with a high pressure gas distributing system.

In the drawings:

Figure 1 is a view showing a gas main, a by-pass extending around a portion thereof, and apparatuses of the present invention fixed to the main for stopping flow of gas through the by-passed section thereof;

Figure 2 is a sectional view taken on line 2—2 of Figure 1, certain parts being shown in elevation;

Figure 3 is a sectional view corresponding to Figure 2 but with the several parts in their uppermost position, certain parts being shown in elevation;

Figure 4 is a sectional view taken substantially on line 4—4 of Figure 2;

Figure 5 is a view corresponding to Figure 4, before deformation of the resilient means of the invention; and Figures 6 and 7 are front and side elevational views, respectively, of a modified form of resilient plug.

Referring now to Figure 1, I have shown a gas main 5, and a by-pass 6 connected about a portion 7 of the main, which is to be repaired, a branch connected thereto or other operation carried out. The by-pass 6 is provided prior to carrying out the desired operation referred to, by mounting saddles 8 upon the main, one on each side of the portion 7. Each saddle is provided with a valve 9 which may be opened to permit gas to flow through the by-pass without interrupting service to consumers along the main 5 which, for example, has only one source of supply. One suitable manner of installing the by-pass and subsequently plugging the openings made in the main therefor is disclosed in my prior Patent No. 2,002,383, and a detail description thereof is not necessary for an understanding of the present invention.

After the by-pass has been installed, apparatuses 10 of the present invention are employed, one adjacent each saddle 8 and valve 9 to stop the flow of gas through portion 7 of the main. In extending a main or the like only one apparatus 10 is necessary for plugging the open end of the main while the extension is being connected.

The method and apparatus for plugging the main at two points to prevent the flow of gas through the by-pass portion 7 of the main is the same in each instance, and a description of one in connection with Figures 1 through 5 follows:

A nipple or tubular sleeve 12 is secured at one end to the main, as by welding, and is externally threaded at its other end to receive an adapter 13 to which the inlet of a valve 14 is threaded. The nipple 13 is internally threaded at 15 adjacent the inlet of the valve 14 for the purpose of receiving a plug to prevent flow of gas therethrough after the desired operation upon the portion 7 of the main has been carried out, as will appear hereinafter. The valve 14 is preferably provided with a sliding valve member 16 for opening and closing the valve upon turning of the handle 17. After the nipple 12, adapter 13, and valve 14 have been positioned as noted, the valve handle 17 is turned to its closed position and a packing gland through which a bit extends, is threaded into the outlet 18 of the valve. The valve 14 is then opened and an opening, preferably of a diameter substantially equal to the internal diameter of the nipple is made in the main, after which the bit is withdrawn beyond the sliding valve member 16, the valve closed, and the bit and packing gland removed. The bit and packing gland employed for this purpose have not been shown since such a device is well known in the art.

A frame 20 comprising a stuffing box member 21 and a screw follower member 22 are provided with suitable openings to receive a pair of steel supporting rods 23, the ends of which are secured to the stuffing box member 21 and screw follower member 22 by nuts 24 to space these members a suitable distance apart. The stuffing box member is provided with a pair of threaded nipple portions 25 and 26, the lower one of which is adapted to be threaded into the outlet 18 of the valve 14. A carrier member 30 preferably comprising a cylindrical steel bar, slotted substantially along its entire length to provide a pair of fork arms 31 and 32, and is adapted to be supported upon the frame. A pusher screw 33 is connected to the end of the carrier member 30 opposite the end of the fork arms 31 and 32 by means of a suitable two part bracket 34. The pusher screw 33 threads through the screw follower member 22 and is movable relative thereto, for positioning the carrier member 30 relative to the frame. The two parts of the bracket 34 are held together by any suitable means, and the bracket is designed to permit rotation of the screw pusher 33 to the desired position relative to the frame without causing rotation of the carrier member 30. Between the fork arms 31 and 32, adjacent their outer ends, I provide a resilient plug 35 preferably made of rubber, which is secured adjacent the outer ends of the fork arms 31 and 32 by means of a threaded pin 36 which extends transversely of the slot between the fork arms 31 and 32 and is threaded in the latter. The carrier member 30 is adapted to be positioned so that the slot referred to extends transversely of the main 5. The outer end of the resilient plug 35 is rounded, at 37, and preferably extends a slight distance beyond the outer ends of the fork arms 31 and 32. The sides of the rubber plug are arcuate so that together with the fork arms 31 and 32 a plug of substantially circular cross section is provided, as will be clear from Figure 5. Means for deforming the rubber plug 35 comprises an injector member or expander 38 which is disposed within the upper portion of the slot of the carrier member 30, and is adapted to slide in the slot for positioning the injector member relative to the carrier member 30. The injector member 38 is provided with a substantially rectangular opening 39 to receive the rectangular end 40 of the resilient plug 35. A pin 41 extends through the lower end of the injector member 38 and rectangular end portion 39 of the plug to secure these parts together. The injector member is provided with a recess 42 at its upper end to receive a shank 43 of a second pusher screw 44 which is threaded through the upper cylindrical end of the carrier member 30 and into a bore 45 extending longitudinally of the first pusher screw 33. A reduced shank 46 is preferably formed integral with the second pusher screw 44 and at its outer end is provided with a square head which is adapted to be engaged by a suitable tool for positioning the second screw member 44 relative to the carrier member 30. The lower shank 43 of the second screw member 44 is provided with an annular recess 47, and a pair of pins 48 extend through the injector member 38 and within the annular recess between the shoulders formed thereby in shank 43 so that the injector 38 may be positioned relative to the carrier member 30 without causing rotation of injector member 38. A coupling 49 having a suitable packing 50 is threaded to the upper nipple portion 26 of the stuffing box member 21 to prevent the escape of gas around the carrier member 30, resilient plug 35, and injector 38, which are adapted to extend through the coupling 49, packing 50, and stuffing box 21.

Now, with the valve 14 in its closed position, the lower threaded nipple 25 of the stuffing box member 21 is threaded into outlet 18 of the valve 14. The handle 17 is then turned to open position. A suitable tool is employed for engaging the square outer end of the first pusher screw member 33 for advancing this member through the valve 14, nipple 12 and into the main 5 until the rounded end 37 of the resilient plug engages the inside wall of the conduit. At this point, the square outer end portion of the second screw member 44 may be engaged by a suitable tool to position this screw member relative to the carrier member 30. Upon rotation of the screw member 44 the injector 38 may be forced downwardly as shown in Figure 2, to deform the resilient plug 35 laterally and transversely of the main 5 into gas-tight contact with the inside wall of the main.

The plug 35 upon being deformed will be slightly expanded in a direction longitudinally of the main to force the fork arms 31 and 32 outwardly away from each other into contact with the wall defining the opening made in the main, which together with the aforementioned lateral deformation of the plug into engagement with the wall of the main will prevent the escape of gas from the main. The arcuate outer surfaces of the fork members 31 and 32 preferably are of an arc, which when displaced snugly seat against the inside wall of the opening in the main and the inside wall of the nipple, providing a substantial area of contact to make a gas-tight joint between these parts.

It will be obvious that, if desired, the opening in the main could be of a smaller diameter than the internal diameter of the nipple, in which case the fork arms 31 and 32 would be forced into fluid-tight engagement with the wall defining the opening in the main in the manner noted.

After the main has been plugged at the two portions adjacent the by-pass saddles 8 and valves 9, the portion 7 of the main may be worked upon and after the work has been completed the screw members 33 and 44 are retracted to their uppermost positions, as shown in Figure 3, the valve 14 closed and the frame 20 removed by unscrewing the lower nipple portion 25 of the stuffing box member 21 from the outlet 18 of the valve. The nipple 12 is plugged by means of a suitable tool having a packing gland which is secured to the outlet 18 of the valve. This tool carries a plug and after the packing gland of the tool has been threaded into the outlet of the valve, the valve 14 is opened and the plug threaded into the internally threaded portion 15 of the nipple 12. Such a tool is well known in the art and need not be described in greater detail. After the nipple has been plugged, the valve 14 and adapter 13 are removed, and the by-pass 6 is then removed and the openings made in the main therefor plugged in any suitable manner. One manner of plugging these several openings made in the main is more fully disclosed in my above referred to Patent No. 2,002,383.

In Figures 6 and 7 I have shown a modified form of resilient plug 35' which is similar in most respects to the plug already described. However, in this plug I provide a plurality of cords 51 which are moulded in the outer marginal edges adjacent the rounded end of the plug which is adapted to be disposed within the gas main. These cords extend transversely of the plug and when inserted in the main extend lengthwise thereof. This type of resilient plug is preferred when the device of the present invention is employed in large diameter mains to prevent displacement of the material in directions lengthwise of the main.

While I have shown my invention in connection with a high pressure gas distributing system for effecting a by-pass there-around to carry out certain operations upon a gas main, it will be understood that the invention is broadly applicable for making a fluid tight seal at one or more points in any conduit.

I claim:

1. Means for stopping flow of fluid in a conduit comprising, a carrier member adapted to be inserted through an opening in said conduit, a resilient plug carried by said member, and means for deforming said resilient plug into fluid-tight engagement with the inside wall of said conduit, said resilient plug upon being deformed forcing said carrier member into fluid-tight engagement with the wall defining said conduit opening.

2. Means for stopping flow of fluid in a conduit comprising a carrier member having fork arms adapted to be inserted through an opening in said conduit, a rubber plug disposed between said fork arms and secured adjacent its outer end to said fork arms, injector means fixed to the inner end of said rubber plug, and means for positioning said member within said conduit, said injector means being movable relative to said member to deform said rubber plug into fluid-tight engagement with the inside wall of said conduit and said fork arms into fluid-tight engagement with the wall defining said conduit opening.

3. Means for stopping flow of fluid in a conduit comprising, a carrier member having fork arms adapted to be inserted through an opening in said conduit, a rubber plug disposed between said fork arms and secured adjacent its outer end to said fork arms, means fixed to the inner end of said rubber plug, means for positioning said member within said conduit, said first means being movable relative to said member to deform said rubber plug laterally into fluid-tight engagement with the inside wall of said conduit and to force said rubber plug and fork arms into fluid-tight engagement with the wall defining said opening, and cord means for said rubber plug preventing deformation thereof longitudinally within said conduit.

IRWIN H. WITT.